US011890772B2

(12) United States Patent
Acciari et al.

(10) Patent No.: US 11,890,772 B2
(45) Date of Patent: Feb. 6, 2024

(54) WINDING MACHINE WITH DEVICE FOR CALCULATING THE POISSON'S RATIO AND RELATED METHOD

(71) Applicant: ITALIA TECHNOLOGY ALLIANCE S.R.L., Bologna (IT)

(72) Inventors: Giuseppe Acciari, Porcari (IT); Fernando Barsacchi, Bologna (IT); Filippo Gelli, Bologna (IT)

(73) Assignee: ITALIA TECHNOLOGY ALLIANCE S.R.L., Porcari (IT)

( * ) Notice: Subject to any disclaimer, the term of this patent is extended or adjusted under 35 U.S.C. 154(b) by 376 days.

(21) Appl. No.: 17/285,567

(22) PCT Filed: Oct. 15, 2019

(86) PCT No.: PCT/EP2019/077897
§ 371 (c)(1),
(2) Date: Apr. 15, 2021

(87) PCT Pub. No.: WO2020/078957
PCT Pub. Date: Apr. 23, 2020

(65) Prior Publication Data

US 2021/0394387 A1 Dec. 23, 2021

(30) Foreign Application Priority Data

Oct. 16, 2018 (IT) ........................ 102018000009482

(51) Int. Cl.
*B65H 18/16* (2006.01)
*B26D 7/27* (2006.01)
(Continued)

(52) U.S. Cl.
CPC ............... *B26D 7/27* (2013.01); *B26D 1/245* (2013.01); *B65H 18/16* (2013.01);
(Continued)

(58) Field of Classification Search
CPC ........ B26D 7/27; B26D 7/2635; B26D 1/245; B65H 18/16; B65H 23/1955; B65H 2301/4148; B65H 2511/12; B65H 2511/17
See application file for complete search history.

(56) References Cited

U.S. PATENT DOCUMENTS 5,308,010 A * 5/1994 Hakiel .................. B65H 18/26 242/534
6,655,629 B1 12/2003 Acciari
(Continued)

FOREIGN PATENT DOCUMENTS

CN 103630444 A 3/2014
EP 1245354 A1 10/2002
(Continued)

*Primary Examiner* — Sang K Kim
(74) *Attorney, Agent, or Firm* — McGlew and Tuttle, P.C.

(57) ABSTRACT

The machine (1;100) comprises a winding station (3; 101), adapted to receive secondary winding cores (T) coaxial with, and adjacent to, one another. The machine further comprises a cutting device (11; 104) with a plurality of blades (13; 105), arranged upstream of the winding station (3; 101) with respect to the feeding direction of the web material (N) and adapted to slit the web material into a plurality of strips (S1-S5) of web material. An in-line measurement arrangement (81-87) is also provided for measuring the Poisson's ratio of the web material (N).

9 Claims, 8 Drawing Sheets

(51) Int. Cl.

| | |
|---|---|
| ***B26D 1/24*** | (2006.01) |
| ***B65H 23/195*** | (2006.01) |
| *B26D 7/26* | (2006.01) |

(52) U.S. Cl.

CPC ....... *B65H 23/1955* (2013.01); *B26D 7/2635* (2013.01); *B65H 2301/4148* (2013.01); *B65H 2511/12* (2013.01); *B65H 2511/17* (2013.01)

(56) References Cited

U.S. PATENT DOCUMENTS

| | | | |
|---|---|---|---|
| 8,096,948 | B2 | 1/2012 | Schreckenberg et al. |
| 2008/0148914 | A1 | 6/2008 | Micheli |
| 2017/0066614 | A1 | 3/2017 | Allen |

FOREIGN PATENT DOCUMENTS

| | | | |
|---|---|---|---|
| EP | 1245519 | A1 | 10/2002 |
| EP | 1652805 | A1 | 5/2006 |
| EP | 2319787 | A2 | 5/2011 |
| GB | 2523390 | A | 8/2015 |
| JP | H05280936 | A | 10/1993 |
| JP | 2011136504 | A | 7/2011 |
| WO | 9628284 | A1 | 9/1996 |
| WO | 9628285 | A1 | 9/1996 |

* cited by examiner

WINDING MACHINE WITH DEVICE FOR CALCULATING THE POISSON'S RATIO AND RELATED METHOD

TECHNICAL FIELD

The present invention relates to improvements to winding machines, in particular to winders or rewinders provided with cutting members, which slit the fed web material into longitudinal strips to produce in parallel a plurality of reels of wound material having an axial dimension smaller than the width of the web material entering the machine. In particular, embodiments disclosed herein relate the so-called slitter rewinders. Especially, the invention relates to improvements to rewinding or winding machines, which slit a web material coming from a primary reel or a production machine into a plurality of longitudinal strips wound into secondary reels.

The invention also relates to improvements to the methods for winding or rewinding a web material, coming from a primary reel or a production machine, into secondary reels, each formed by a respective strip into which the web material from the primary reel has been slit.

BACKGROUND ART

In many industrial sectors web materials, i.e. thin materials, are produced which are wound into primary reels, also called parent reels or master rolls. To produce packages of web material intended for subsequent use, the web material of the primary reels is unwound and rewound into reels or rolls of smaller diameter through rewinding processes or methods. In some cases, during rewinding the web material is also slit into a plurality of adjacent longitudinal strips by means of a cutting device comprising a plurality of typically disc-shaped blades or knives. In this way, the rewinder directly forms reels of small axial dimension. The rewinders comprising, to this end, longitudinal cutting devices are also referred to as slitter rewinders. Embodiments described below relate to this type of machines.

These rewinders are used in plants or lines for processing plies of non-woven fabric, paper and the like. These materials, rewound into secondary reels, can be used as semi-finished products for subsequent production cycles in so-called converting lines. Typically, secondary reels of non-woven fabric are used to feed converting machines for the production of baby diapers, sanitary napkins, incontinence pads and similar products. These machines are very complex, require high quality reels and do not allow the use of defected materials, in particular in consideration of the final use for which the articles are intended.

In the specific field of non-woven fabrics, but also in similar fields, for example in the paper field, the primary reels can be formed by machines called "winders", fed by a web material forming line.

For users of reels produced by these machines, it would be useful to have as much information as possible on the characteristics of the wound web material. This information is also useful for the producer of the web material, in order to control, modify, optimize or in any case intervene on the web material production process or on the primary reels winding process.

SUMMARY

According to one aspect, a machine is disclosed for winding a web material into a plurality of secondary reels, comprising: a winding station, adapted to receive secondary winding cores, which are adjacent to one another and coaxial with one another; if necessary, a cutting device with a plurality of blades, arranged upstream of the winding station with respect to the web material feeding path and adapted to slit the web material into a plurality of strips of web material; an in-line measurement arrangement for measuring the Poisson's ratio of the web material.

The Poisson's ratio, or ratio of transverse strain, is a temperature-dependent coefficient that measures the transverse expansion and contraction of a material subjected to a longitudinal unidirectional stress.

In some embodiments, the cutting device may not be provided or be inactive. In this case, the web material is wound into reels without first being slit into strips.

According to another aspect, a method is provided for winding a web material, comprising the following steps:

- feeding a web material along a feeding path towards a winding station, where a series of winding cores is inserted, which are coaxial with one another and adjacent to one another;
- cutting the web material into a plurality of strips of web material along the feeding path;
- winding the strips of web material and forming, therewith, a plurality of secondary reels;
- detecting the Poisson's ratio of the web material during the forward movement thereof along said feeding path.

Knowing the Poisson's ratio of the web material can be useful for many reasons. Firstly, it is a piece of information that could be useful to provide to those who will use the reels for converting them and producing finished or semi-finished products. Knowing the Poisson's ratio can be useful, for example, to adjust the operating parameters of the reel converting lines. Furthermore, in some cases it may be useful to know the Poisson's ratio of the web material in order to modify, control or manage upstream production parameters. This can be useful, for example, for keeping the Poisson's ratio in a desired range of values, thus ensuring constant quality of the product exiting the production machine. By measuring the actual Poisson's ratio, it is possible to act on one or more upstream production parameters, for example in order to reduce or eliminate an error between the measured Poisson's ratio value and the set value.

Further features and embodiments of the machine and the method of the present invention will be described below with reference to the attached drawing.

BRIEF DESCRIPTION OF THE DRAWINGS

The invention will be better understood by following the description below and the attached drawing, showing a non-limiting embodiment of the invention. More specifically, in the drawing.

DETAILED DESCRIPTION OF EMBODIMENTS

In the description below, specific reference will be made to the processing of a web material consisting of a non-woven fabric. However, it is to be understood that this type of material is indicated just by way of a non-limiting example. Aspects of the winding machines, such as winders or rewinders, and of the winding and rewinding methods described herein may also be advantageously applied for rewinding strips of web material other than non-woven fabric, for example plastic film, paper and especially tissue paper ort the like.

Specific reference will be made below to particularly advantageous embodiments of rewinding machines and more precisely to slitter rewinders, and to the related methods for rewinding a web material coming from a primary reel into a plurality of secondary reels, after slitting (cutting) the web material into single longitudinal strips.

Some features and advantages described below with reference to a slitter rewinder and the related rewinding method can be advantageously applied also to winding machines receiving a continuous web material directly from a production machine, and comprising, upstream of the winding area, a longitudinal cutting system for slitting the web material into individual longitudinal strips, each of which is wound into a respective reel of a plurality of reels produced in parallel from a same web material.

Figure 1:
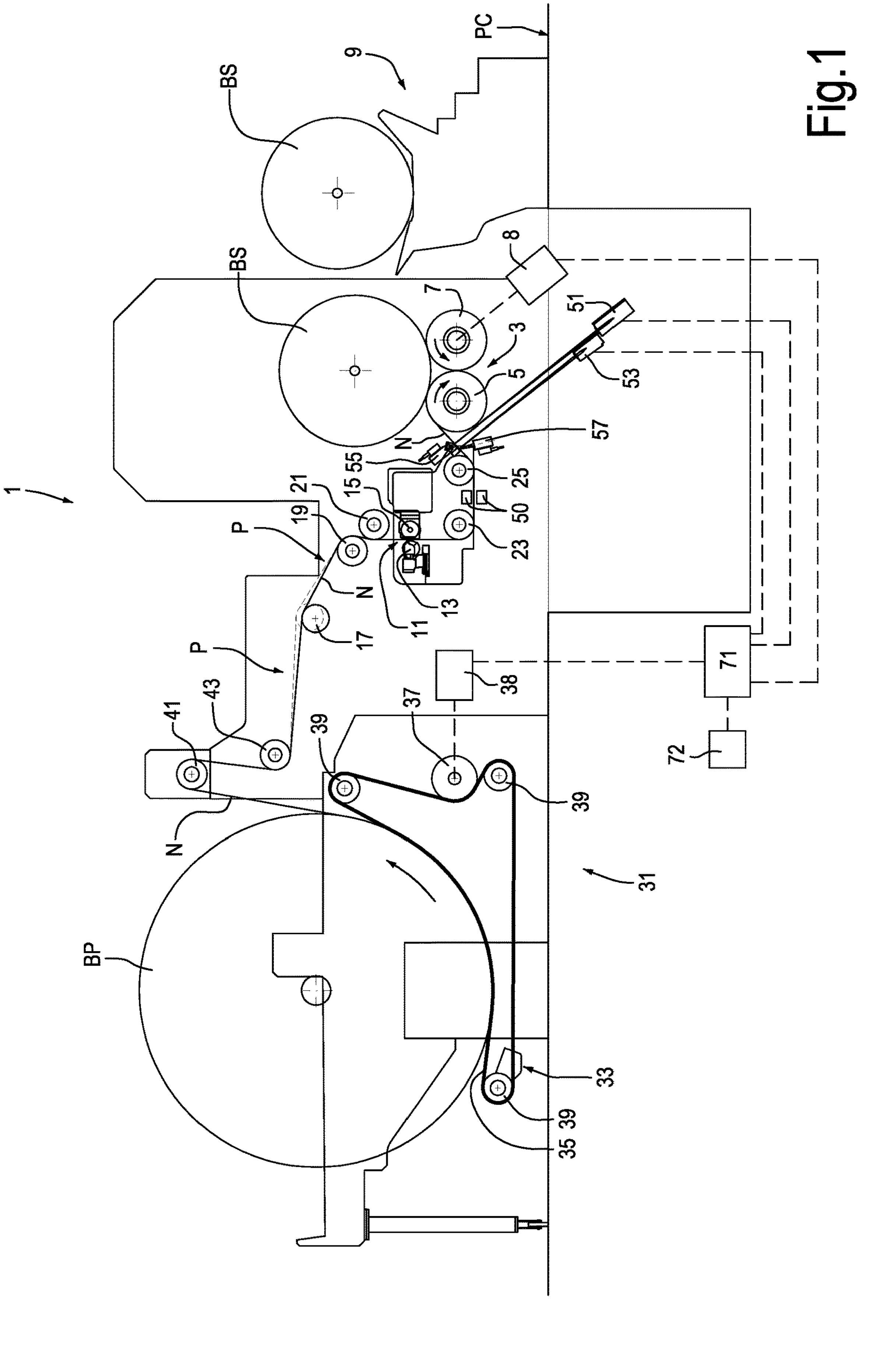
FIGS. 1, 2 and 3 are schematic side views of a rewinder (slitter rewinder) in three different embodiments.

With initial reference to the embodiment of FIG. 1, a rewinder, indicated as a whole with number 1, comprises a winding station 3, where a web material N, unwound from a primary reel BP, is wound on one or more secondary reels BS. P indicates the feeding path of the web material N, for example a non-woven fabric, from the primary reel BP towards the winding station 3. The feeding direction of the web material N is indicated with F. The secondary reels BS are formed around tubular winding cores arranged in the winding station 3.

The overall structure of the rewinder 1 may be of a known type; therefore, only the main parts, useful for understanding the present invention, will be described below.

More particularly, the rewinder 1 is a so-called slitter rewinder, which receives an intact web material and slits it into a plurality of longitudinal strips, each of which is wound onto a secondary reel BS. In the winding station 3, several secondary reels BS are arranged, adjacent to, and substantially coaxial with, one another, each receiving and winding a respective strip of web material.

In some embodiments, the winding station 3 comprises a winding cradle. In the embodiment shown in FIG. 1, the winding cradle comprises peripheral winding members. These peripheral winding members may comprise two winding rollers 5 and 7, forming together the winding cradle. Each winding roller rotates around an axis, controlled for example by an electric motor. To this end, two separate motors can be provided or a single motor with a transmission system. FIG. 1 shows schematically a motor 8 for controlling the winding rollers 5, 7.

The rotation axes of the winding rollers 5, 7 are parallel to each another and lie on a substantially horizontal plane, so that the secondary reels BS can rest on the winding rollers 5, 7 by gravity. Further winding members may be also provided, for example a third winding roller arranged over the reels BS and having a mobile axis to follow the growth of the secondary reels BS during the winding cycle. Reference number 9 indicates an unloading system for unloading the secondary reels BS from the winding station 3.

The rewinder 1 also comprises a cutting device 11 including a series of disc-shaped knives or blades 13 co-acting with a series of corresponding counter-blades 15 or with a counter-roller. The cutting device 11 can be configured in a known manner. Examples of cutting devices are disclosed for instance in EP1245354 and EP1245519, WO96/28285, WO96/28284, US2008/0148914.

Each blade 13 and each counter-blade 15 can be adjustable in transverse direction, i.e. orthogonally to the feeding path P of the web material N, to cut longitudinal strips of web material of suitable width. FIG. 4 schematically shows six cutting blades 13, which slit the web material N into five longitudinal strips S1, S2, S3, S4, S5 and two lateral trimmings R1, R2. The number of longitudinal strips is purely indicative. In general, the web material N can be slit into a plurality of "n" strips S1-Sn.

The reference number 12 indicates a device for detecting the position in transverse direction (i.e. orthogonally to the plane of the figure) of the blades 13. For example, the device 12 may comprise an encoder, which detects the absolute displacements of the individual blades when they are positioned. Systems for detecting the blade position are known per se; therefore, they are not described in detail herein. As it will be clearly apparent from the description below, the device 12 can be useful not only for detecting and storing the blade position, in order to manage it, but also for determining the width of the strips of web material in the area where they are formed, slit by the blades 13 and the counter-blades 15.

Along the feeding path P of the web material N, guide rollers 17, 19, 21 can be arranged upstream of the cutting device 11, and guide rollers 23, 25 can be arranged downstream of the cutting device. The number and position of the guide rollers are given just by way of example. In some embodiments, one of the rollers upstream of the cutting device 11, for example the roller 17, can be a spreader roller, i.e. a so-called bowed roller, which transversely stretches the web material N to remove wrinkles or creases.

The rewinder 1 may comprise an unwinder 31, provided with members for unwinding the primary reels BP. The unwinder 31 can be an integral part of the rewinder 1, or it can be a separate machine combined with the rewinder 1. The unwinder 31 comprises unwinding members, for example tailstocks, which axially engage the primary reel BP. In other embodiments, as illustrated schematically in FIG. 1, the unwinder comprises peripheral unwinding members 33, which may comprise one or more continuous belts 35 driven around pulleys 37, 39, one of which (for example the pulley 37) is motorized. In FIG. 1, number 38 schematically indicates the motor of the motorized pulley. Guide rollers 41, 43 can be provided to guide the web material N towards the bowed roller 17. In other embodiments, central and peripheral unwinding members can be provided in combination.

The rewinder 1 of FIG. 1 is provided with a web material evaluation system comprising a first video camera 51 and a second video camera 53. The video cameras 51, 53 can be housed in a pit under the floor PC, on which the main structure of the rewinder 1 stands, and can be arranged at such a distance from the feeding path P of the web material N as to frame the entire width of the web material N.

The video cameras 51, 53 can be combined with lighting devices. In the illustrated embodiment, a first lighting device 55 is provided for the first video camera 51 and a second lighting device 57 is provided for the second video camera 53. In the embodiment of FIG. 1, the first video camera 51 and the first lighting device 55 are arranged on opposite sides of the feeding path P. The first video camera 51 therefore acquires transparent images of the web material N. Vice versa, the second video camera 53 and the second lighting device 57 are arranged on the same side of the feeding path P, and the second video camera 53 therefore acquires reflective images. "Transparent" or "in transparency" means that the web material N passes between the lighting device and the video camera, and it is therefore back-lit with respect to the video camera. Conversely, "reflective" or "in reflection" means that a contrast screen is arranged on the opposite side with respect to the video camera and the lighting device. Sometimes, the screen advantageously consists of a roller, around which the web material N is driven. In this case, the focusing of the video camera is easier.

If a video camera is not able to frame the entire web material N in transverse direction, in order to analyze the entire width of the web material N several video cameras (usually two to four) can be provided, aligned with one other.

In the configuration of FIG. 1 the video cameras 51 and 53 with the respective lighting devices 55, 57 are arranged in the last segment of the feeding path P of the web material N, that is directly upstream of the first winding roller 5. In practice, no other mechanical members are arranged between the areas framed by the video cameras and the point where the strips of web material are wound onto the secondary reels BS. In this way, it is possible to take images of the web material N exactly as it is wound on the secondary reels BS, without other operations being performed on the web material N that could lead to defects or otherwise modify the features of the strips of web material.

In other embodiments, the video cameras can be arranged further upstream than what illustrated in FIG. 1, but preferably downstream of the cutting device 11.

In the diagram of FIG. 1, reference number 50 indicates a metal detector, which can be positioned downstream of the cutting device or unit 11, for example between the guide rollers 23 and 25. In this position, it is possible to detect the presence of metal particles, which can for example detach from the blades and/or counter-blades.

Figure 2:
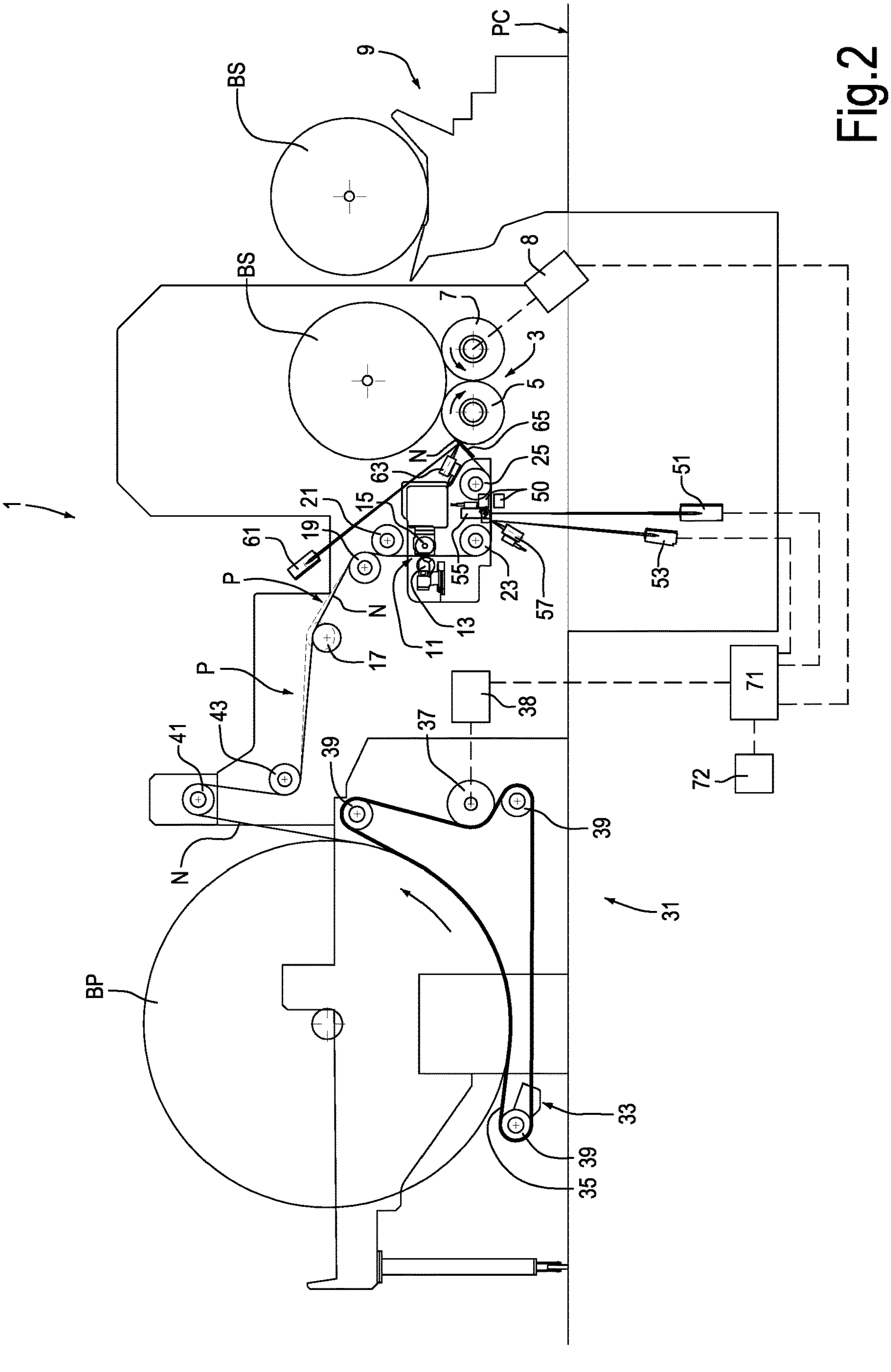
Figure 5:
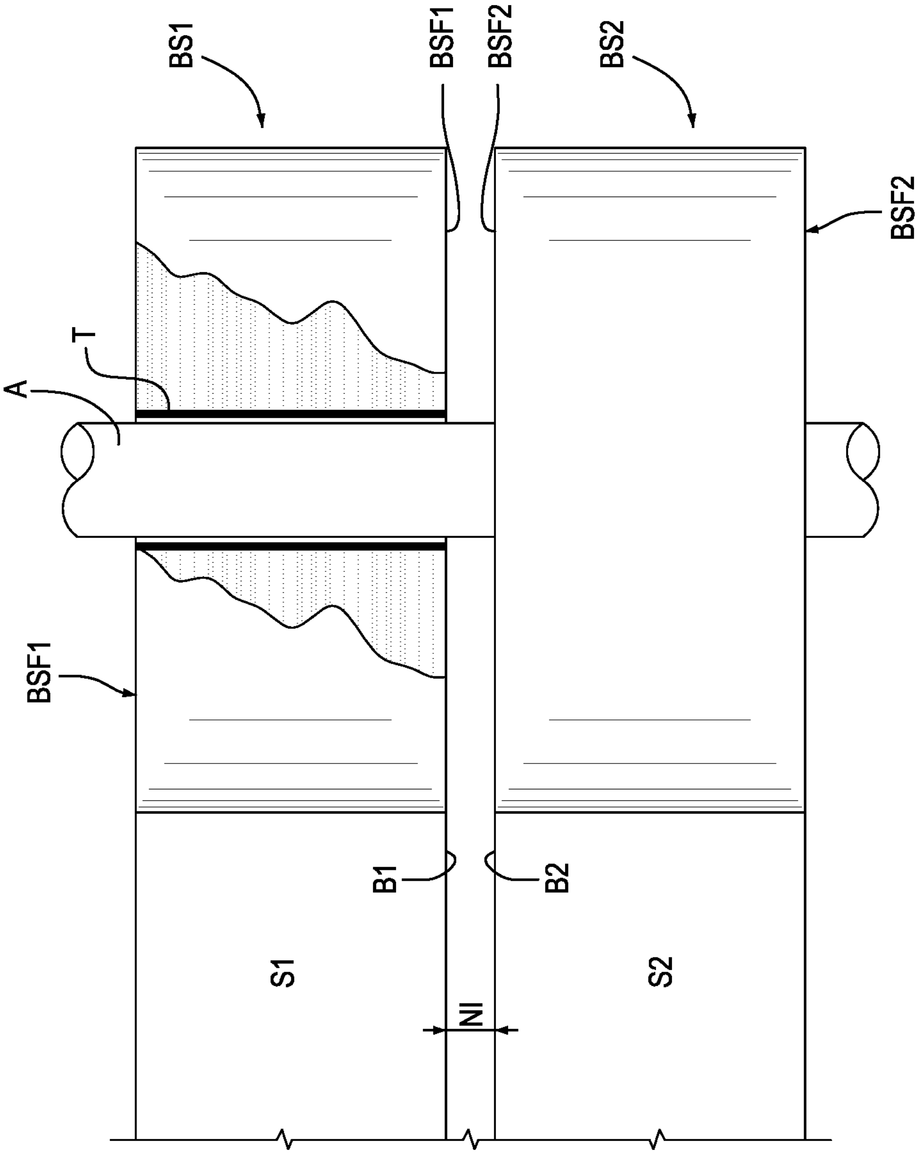
FIG. 5 is a schematic view of two secondary reels during winding.

FIG. 2 shows a second embodiment of a rewinder 1 according to the invention. Equal numbers indicate equal or equivalent parts to those described with reference to FIG. 1, which will not be described again. In the embodiment of FIG. 2, two video cameras 51, 53 are provided with respective lighting devices 55 and 57, adapted to acquire transparent and reflective images, similarly to what illustrated in FIG. 1. However, in this second embodiment the two video cameras 51, 53 are arranged slightly further upstream along the feeding path P and more exactly between the two guide rollers 23, 25 that are arranged before the winding roller 5. This allows arranging a third video camera 61 with a respective lighting device 63 directly upstream of the first winding roller 5. In this embodiment, the third video camera 61 takes reflective images. It can be arranged so as to frame a portion of web material N in contact with the winding roller 5 or, as shown in FIG. 5, a portion of web material N in contact with a diffusing or reflecting screen 65, for example directly adjacent to the winding roller 5.

Figure 3:
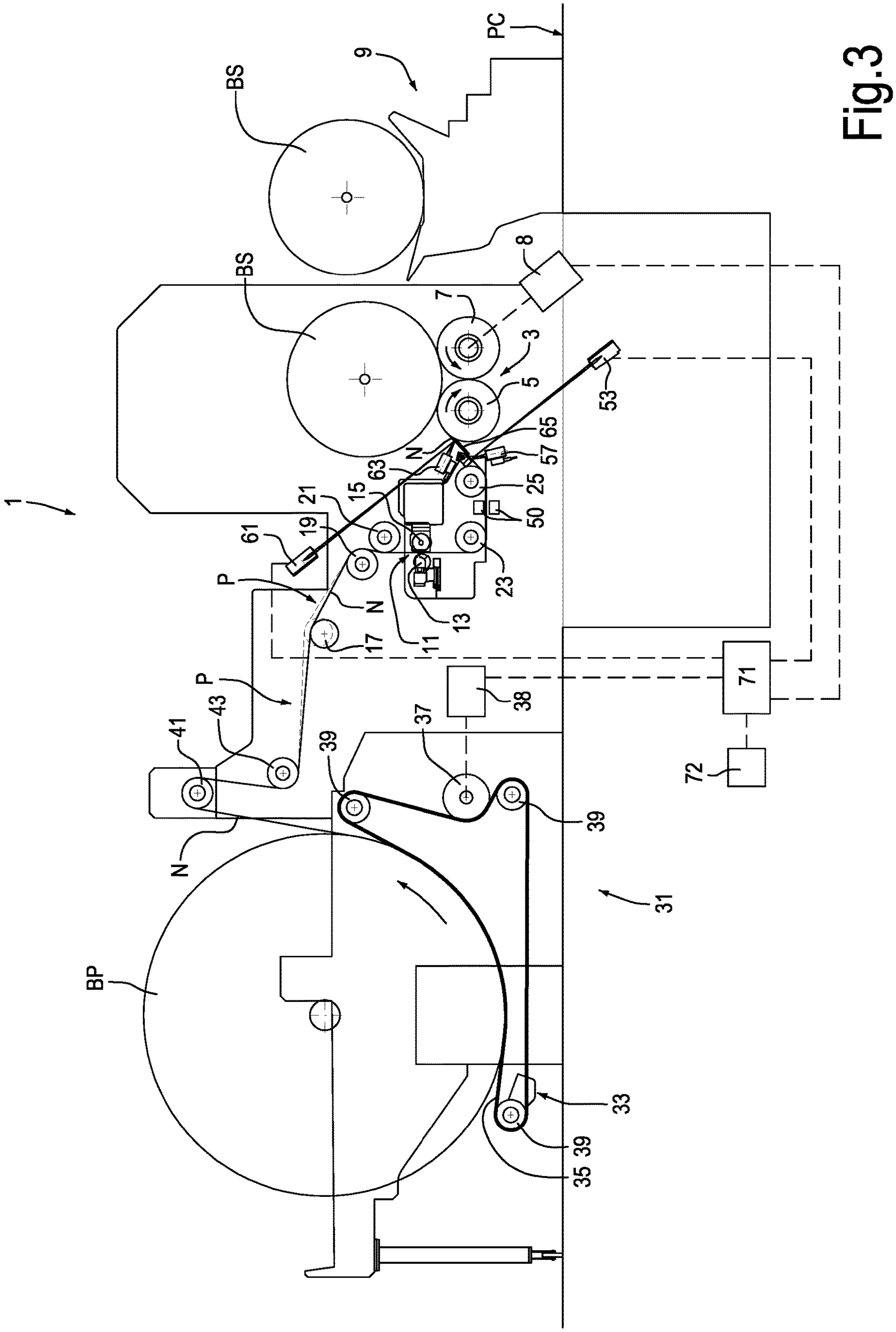

The arrangement and the number of video cameras described with reference to FIGS. 1 and 2 are given just by way of example, and other arrangements are possible. For example, FIG. 3 shows a rewinder 1, which differs from the previous ones mainly in the different arrangement of the video cameras. In this case, a first reflective video camera 53 is provided with a respective lighting device 55 that are arranged as in FIG. 1, and a second video camera 61 with a respective lighting device 63 that are arranged as in FIG. 2, but without the video camera 51.

In other embodiments, not shown, only one video camera (or array of video cameras) can be provided, based on the reflection or, preferably, the transparency system.

The video cameras can be interfaced with a programmable control and processing unit, for example a PLC or a computer, schematically indicated with 71. The programmable unit 71 collects and processes (in real or deferred time) the images taken by the video camera(s), with which the rewinder 1 is provided.

The images can be processed, for example, for identifying any defects or criticalities in the web material N. As the video cameras are arranged so as to frame the strips of web material N in areas very close to the winding point (winding rollers 5, 7), it is possible both to identify defects made on the web material in the last processing steps, for example when it is slit into strips, and exactly to localize in which secondary reel BS the detected defect is located.

Generally speaking, the purpose of the video camera system described herein is to check the web material at the end of the web forming process and the web handling process, in order to detect the defects due to both processes (formation of the web material and handling thereof, for example cutting and rewinding thereof). Therefore, the system is not used to prepare a map of the defects allowing the operator to remove the defects from the web material during the rewinding phase, but to certify the quality of the secondary BS reels produced by the manufacturer of the non-woven fabric or other web material N.

This innovative arrangement of video cameras in the rewinder 1 has many advantages, some of which are listed below.

For example, the system can verify that the operator of the rewinding machine has effectively removed all the defects detected by the first vision system (and/or by the metal detector), installed upstream of the winder (not shown). In fact, it could happen that, by mistake, the product destined to be discarded is wound into secondary reels BS destined to the sale. For example, when starting the production of a certain type of non-woven fabric, for technological reasons a non-calendered non-woven fabric is produced, destined to be wasted and usually excluded from the rewinding process; but due to an operator error it could be wound into secondary reels destined to the sale. The innovative arrangement of video cameras according to the invention prevents this.

The video cameras arranged as described above allow verifying that no longitudinal creases are formed during cutting and rewinding. In fact, after the web material N has been slit into strips S1-Sn, also due to the fact that the speed of the web material during the rewinding step is significantly higher than the speed of the web material during the formation step (approximately 2-3 times higher), longitudinal creases may be formed. These are formed due to aerodynamic effects which are present when the web material moves forward at high speed and disappear when the web material moves forward at low speed. That is, the creases are formed during normal winding, but disappear when the outer layers of the secondary reel are wound.

In fact, the outer turns of the secondary reels BS are wound when the rewinder is in deceleration ramp step, i.e. when the speed of the web material is reduced. Due to this, a simple visual examination of the outside of the secondary reel BS does not allow to recognize whether the reel has longitudinal creases thereinside. On the contrary, the arrangement of video cameras described herein makes it possible to identify this defect, independently of the step when it occurs.

The arrangement of video cameras described herein allows detecting any lateral movement of the strips due to aerodynamic effects. These movements must be avoided, as they could compromise the flatness of the reel heads. This defect can be readily detected and measures can be taken to avoid jeopardizing the quality of the secondary reel, or to discard the reel. More details on the methods usable for controlling these phenomena will be described below with reference to specific embodiments.

The arrangement of the video cameras described above allows controlling the quality of the cut edges so as to monitor the wear of the disc-shaped blades 13 cutting the edges.

The video cameras also allow verifying whether a blade 13 has stopped cutting, thus compromising the good quality of the whole series of secondary BS reels wound in a winding cycle. In fact, if one of the blades 13 stops cutting, a wrap up of the whole machine can easily occur, which compromises the winding of the whole series of reels.

The video cameras also allow to check the presence of all the strips S1-Sn and to verify that they move in the desired direction forming the respective secondary reels BS. If, due to any problem (breakage of the strip, or other problem), the path of a strip changes and the strip starts to be wound around another mechanical member, this would lead to malfunctions and breakages of members of the rewinder, with consequent downtimes and production loss. Therefore, the prompt notification of situations of this type by using video cameras as described above has significant advantages in terms of time-savings and reduction of maintenance costs and spare parts.

Video cameras may constitute systems for measuring the width of the strips and of the so-called neck-in between the various strips S1-Sn, i.e. the mutual distance between edges of adjacent longitudinal strips due to the transverse contraction thereof following the tension of the web material. The neck-in is the distance between the edge of one strip and the edge of the adjacent one. This aspect will be further illustrated below with reference to some specific operating methods.

Determining the neck-in can be useful for various reasons. In particular, although not exclusively, determining the neck-in of a given web material facilitates prediction of the neck-in of web materials produced with different recipes.

Sometimes, defects are found in diapers or in other finished products produced by using the web material of the secondary reels BS. For example, insects can be found, caught in the plies of diapers. In this case, it is always difficult to establish whether the defects were generated at the plant of the manufacturer of the non-woven fabric or other web material N, or if they were generated in the processing plant where diapers or other finished products are produced. With a vision system installed immediately before winding it is easier, in these cases, to verify the responsibilities.

The width of the strips of wound web material is a quality index of the secondary reels BS. The more constant the width of the strip forming a secondary reel BS, the greater the quality of the reel. This condition is necessary in case that further components (such as glue, elastics, fluff, etc.) are deposited on the web material unwound in the converting machine producing the finished articles (diapers or other products). In fact, if the web material is narrower than indicated, there is the risk that the components deposited exit the edges of the web material being unwound and do not couple therewith. The vision system, by calculating instant by instant the width of the strips of web material, can certify that the width of the web material wound inside each secondary reel BS is within the allowable limits. Depending on the allowance, if necessary it is possible to classify the secondary reels BS in different quality classes, for example first choice reels and second choice reels.

Without the evaluation system of the web material described herein it is possible to verify the width only by destroying the secondary reel to be evaluated. That is, this quality test is a destructive test, and currently it is therefore performed only randomly. The new system for evaluating the web material avoids these drawbacks and allows saving material, as it avoids destructive checks, also allowing testing all the produced reels and not only some samples randomly.

A further index of the quality of the reels is the flatness of the end surfaces thereof. The measurement of the absolute position of the edges of the various strips S1-Sn forming the various secondary reels BS is an indirect index of the flatness of the end surfaces of the secondary reels BS. The evaluation system of the web material, by controlling the position of the edges of the strips of web material, allows keeping under control also this feature of the secondary reels BS.

The evaluation system of the web material described herein also allows further advantages.

In fact, the secondary reels BS having a defect inside are sorted by the packaging machines so that they are not sold as first quality reels, but follow a different path in the logistics system. For example, they can be sold as second quality reels or they can be used for recycling the raw material. There is therefore a classification of the secondary reels BS based on the presence of defects. According to the state of the art, this classification is based on the signal of the vision system installed before the winding machine and on the basis of the distribution map of the reel BP into secondary reels. This map is prepared based on the position of the blades 13 and on the nominal length of the web material wound onto each series of secondary reels BS wound in a winding cycle. However, tracing the map of the primary reel BP is also affected by parameters that are difficult to evaluate, such as:

a. the elongation of the web material due to the winding tension in the winder and the winding tensions during the rewinding step,
b. the length of the web material discarded during the rewinding step,
c. the transverse shrinkage of the web material due to the high value of the Poisson's ratio of the non-woven fabric and to the winding tension (in the winder) and the winding tensions during the rewinding step. This shrinkage causes the defects to move towards the centerline when the web material is subject to tension. Therefore, when drawing the map it is difficult to establish precisely the position of the longitudinal cuts, and consequently to establish which is the secondary reel BS where the defects detected upstream of the winder will occur,
d. during the steps of unwinding the primary reel BP and rewinding into secondary reels BS, the bowed roller 17 tends to widen the web material, i.e. it tends to move the defects away from the centerline. In the reel distribution map it is therefore difficult to establish exactly the "boundaries" of the secondary reels, and this makes difficult to know whether a defect pertains to one or another secondary reel, especially if the defect is found in a border area. The new system disclosed herein allows directly reading the defects and the position thereof, making thus possible to know in which reel a certain defect occurs.

To cut longitudinally the web material N into longitudinal strips S1-Sn by means of the blades or knives 13 of the cutting device 11, the web material must be subjected to a longitudinal tension. Once the web material N has been slit into longitudinal strips, due to the transverse contraction caused by the longitudinal traction, the width of each strip is smaller than the distance between the cutting edges of the blades 13, which have formed said strip. That is, after cutting the strip shrinks, due to the tension and the high value of the Poisson's ratio of the web material.

Figure 4A:
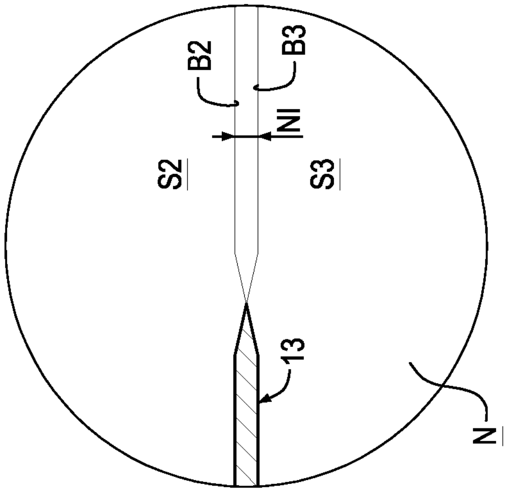
FIG. 4A is an enlargement of the detail indicated by the letter A in FIG. 4.
Figure 4:
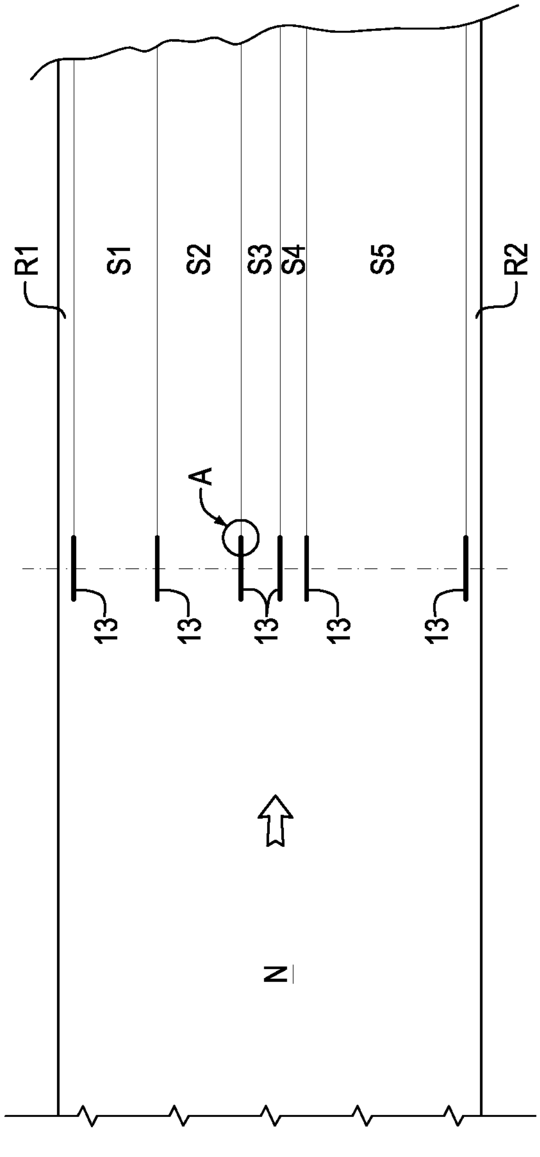
FIG. 4 is a schematic view of the area where the web material is slit into longitudinal strips.

This phenomenon is schematically shown in FIG. 4A. The distance between adjacent edges of two adjacent strips is called "neck-in" and is indicated, in FIG. 4A, with NI. In FIG. 4A the neck-in is shown between the longitudinal edge B2 of the strip S2 and the longitudinal edge B3 of the adjacent strip S3.

In the rewinding machines 1 of the type described herein, the positioning in transverse direction of the blades 13 and of the respective counter-blades 15 is controlled by a computer or a programmable control unit 71 which calculates the different positions at which the blades shall be positioned based on the width of the longitudinal strips S1-Sn of web material N to be produced. The calculation program for positioning the blades 13 requires the operator to input data, including the width of each strip to be obtained and the shrinkage value (the neck-in value). Each blade is positioned in the centerline of the neck-in (or in such an intermediate position that the fraction of neck-in which is to the left of the blade 13 is proportional to the width of the strip S1-Sn to the left of said blade, while the fraction of neck-in which is to the right of the blade 13 is proportional to the width of the strip to the right of said blade. Other alternative proportionality criteria are also possible.

Moreover, one of the market requirements is that in the secondary reel BS no parts of tubular winding core project outside the flat face of the reel, for at least two reasons.

Firstly, when the secondary reels BS are packaged and prepared for shipment to the converting plant, they are stacked with the rotation axis thereof in vertical position, so that during transport the reels do not take an oval shape. In order for the stack of reels to be stable, the tubular winding cores must not project axially from the reels.

Secondly, in the converting step, when the secondary reels BS are unwound to produce the final product (for example diapers, sanitary napkins, soaked wipes, and other articles), they are positioned on the unwinding mandrel of the converting machine. The correct axial position is identified by placing the tubular winding core against an axial reference provided on the mandrel. Any protrusion of the tubular winding core with respect to the flat end surfaces of the reel would lead to positioning errors, negatively affecting the production of the finished product.

While the strip width values can be evaluated easily, because they represent the goal of the production, the neck-in values are difficult to be determined. The width of the neck-in is affected by many factors, including: the mechanical properties of the web material; the width of the strips adjacent to the neck-in; the temperature of the web material during rewinding; the tension to which the web material is subject; the effect of the bowed roller 17 or of any other system for enlarging the web material.

The data on the width of strips and neck-ins are used by the machines that shall cut and position the tubular winding cores of the secondary reels BS on winding rods or shafts, which are then inserted into the winding station 3 for forming, around each tubular winding core, a respective secondary reel BS. On the basis of the aforementioned data, the tubular winding cores are formed by cutting a tube of greater axial length and positioned on the winding rods or shafts so that the edges of the winding cores are aligned with the flat faces of the reels. These preliminary operations can be performed by means of known machines, disclosed for example in U.S. Pat. No. 8,096,948 and in U.S. Pat. No. 6,655,629, which may be referred to for more details.

According to the state of the art, the neck-ins are evaluated based on work experience, or based on attempts by successive approximations. This method is not satisfactory.

Through the web material evaluation system, some embodiments of the rewinders described herein allow to measure the position of the edges of the web material N slit into longitudinal strips S1-Sn in a suitable position, and preferably immediately before the winding point, so as to transmit the necessary data to the machines preparing the winding rod or shaft, with the tubular winding cores inserted thereon. The aim is to loop-close the chain of operations that includes:

- positioning the blades 13 and the counter-blades 15 for cutting the web material N,
- cutting the tubular winding cores,
- positioning the tubular winding cores onto the winding rod or shaft,
- winding the strips of web material into secondary reels BS, taking into account the shrinkages and the causes thereof mentioned above.

Essentially, after having cut and slit the web material N into longitudinal strips S1-Sn, the evaluation system of the web material N described herein allows to detect accurately the position of each longitudinal edge (e.g. the edges B2, B3 in FIG. 4A) and then to determine or verify the width of each strip and the neck-in NI (see FIG. 4A) between each pair of adjacent strips. Based on these data, it is possible to prepare tubular winding cores of correct axial length and to position them accurately onto the respective winding rod or shaft. In this way, the edges of the tubular winding cores will coincide with the edges of the strips S1-Sn, without the need for the operator to intervene for processing and inputting data. Consequently, the ends of each tubular winding core will be surely in the correct position with respect to the flat surfaces of the respective secondary reel BS.

The position of the longitudinal edges of the strips S1-Sn can be detected, downstream of the cutting device 11, by means of one or more video cameras, with which the machine 1 is provided.

For better understanding what explained above, in FIG. 5 a pair of secondary reels BS1, BS2 are schematically shown, onto which two strips S1 and S2 respectively of web material N are being wound. B1 and B2 indicate the longitudinal edges adjacent to each other of the strips S1 and S2. The secondary reels BS1, BS2 are wound around tubular cores T, inserted and locked onto a winding rod or shaft A. The shaft can be expandable, for example pneumatically, in known manner. A variable number of tubular winding cores can be mounted onto the shaft, corresponding to the number of secondary reels being formed simultaneously.

As shown in the diagram of FIG. 5, where the reel BS1 is shown in a partial cross-sectional view, the tubular cores T have ends that are inside or preferably flush with the head surfaces, i.e. flat front surfaces BSF1 and BSF2 of the secondary reels BS1, BS2. In this way, the tubular winding cores T do not constitute an obstacle to the subsequent processing and converting of the secondary reels BS.

According to methods described herein, different techniques can be used to detect the neck-ins NI, i.e. the distances between adjacent longitudinal edges B2, B3 (FIG. 4A) or B1, B2 (FIG. 5). For example, a vision system can be used, comprising at least one video camera or several video cameras aligned with one another, as described with reference to FIGS. 1, 2, and 3. Advantageously, the video camera(s) may be arranged to frame the web material N slit into strips immediately upstream of the winding point, as illustrated for example in FIG. 1 for the video camera 51 or in FIGS. 2 and 3 for the video camera 61. In this way, the data on the width of the strips S1-Sn and the size of the neck-in are accurately determined and cannot be modified due to further processing before winding.

Instead of using video cameras and the related image processing software, in order to determine the width of the strips S1-Sn and the neck-in, other alternative systems can be used, for example laser scanners, photocells, electrostatic systems or the like.

Figure 6:
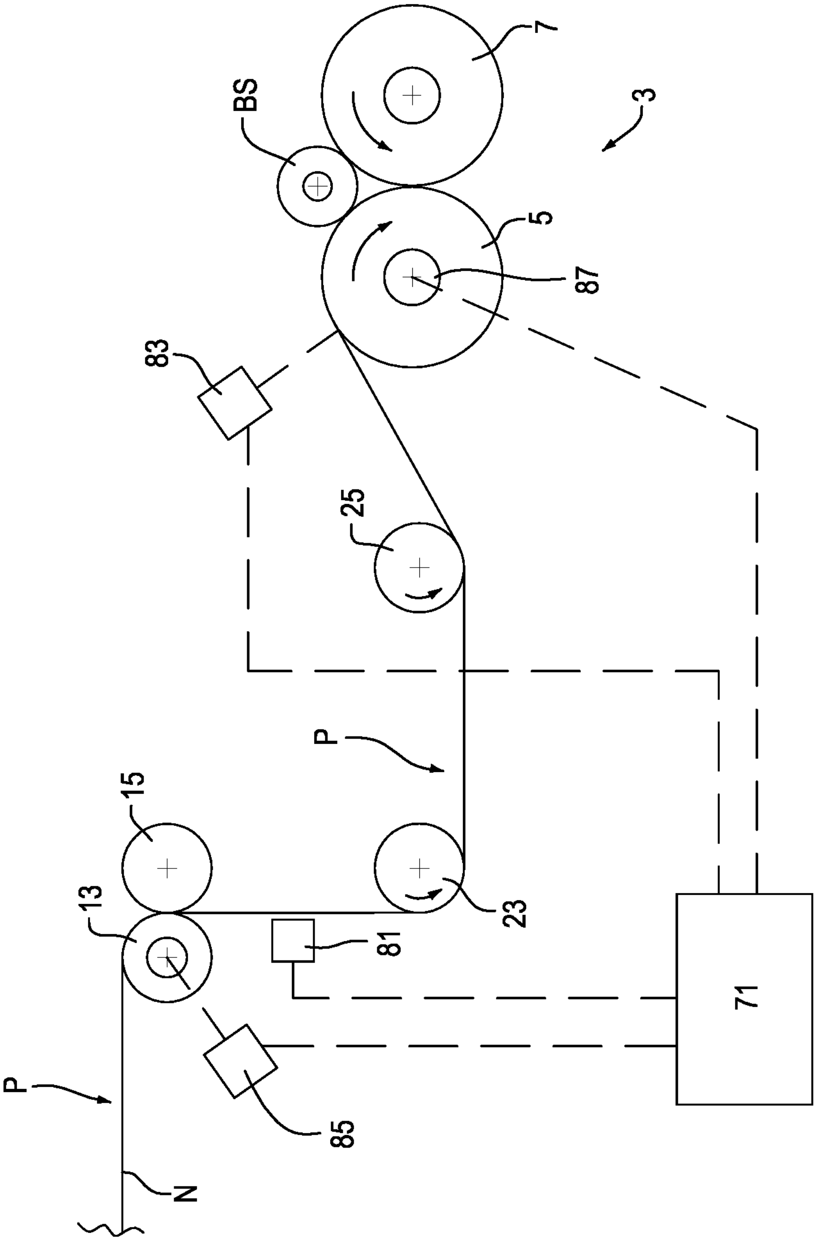
FIG. 6 is a schematic view of the components for calculating the Poisson's ratio of the web material in a rewinder according to embodiments described herein.

In some embodiments of the rewinder 1, the web material evaluation system can comprise an arrangement for measuring the Poisson's ratio, i.e. the ratio of transverse strain. FIG. 6 shows a simplified diagram of some parts of the rewinder 1, with a possible arrangement of members of the evaluation system of the web material N useful for detecting the Poisson's ratio. In FIG. 6, equal numbers indicate parts already described with reference to FIGS. 1 to 3. The evaluation system elements used for measuring the Poisson's ratio can comprise a first device 81 for acquiring information on a first width (i.e. the transverse dimension with respect to the feeding direction) of the web material in a first position of the feeding path P. A second device 83 may be also provided for acquiring information on a second width of the web material in a second position of the feeding path P. The devices 81 and 83 may be video cameras or linear arrangements of video cameras, or any other device, for example of the type described above, adapted to detect the width of the web material N. The devices 81, 83 may also comprise one or more video cameras described above with reference to the diagrams of FIGS. 1 to 3, for example the video cameras 51, 53, 61.

In the diagram of FIG. 6, the first position where the first device 81 is arranged is immediately downstream of, or placed at, the cutting device 11. In this way it is possible to detect the width of each individual strip S1-Sn obtained by longitudinally cutting the web material N, or the width of only one or some strips. The second device 83 is arranged downstream of the first device and, in the example of FIG. 6, in front of the winding roller 5.

The two positions mentioned above of the devices 81 and 83 are given just by way of example, and different positions can be provided. In general terms, the two positions are such that the feeding speed of the web material is slightly different in the two positions, so that the web material is subjected to longitudinal elongation, and consequently to transverse contraction, due to the tension induced by the different feeding speeds.

While in FIG. 6 the two positions where the width of the web material is measured are arranged downstream of (or at) the cutting device 11, in other embodiments, not shown, the width and the feeding speed are detected upstream of the cutting device 11, so as to calculate the Poisson's ratio of the web material N before it is slit into strips S1-Sn. For example, the device 81 may be associated with the unwinding members 33 of the unwinder 31.

The width of the strips can be firstly measured by detecting the position of the cutting edges of the disc-shaped cutting blades 13. In this case: the first measurement position coincides with the position of the disc-shaped cutting blades 13 along the web material feeding path and the first measurement device can be a device detecting the transverse position (i.e. the position in a direction orthogonal to the web material feeding direction) of the disc-shaped cutting blades 13.

More than one pair of devices may be also provided for detecting the width of the web material, for example both upstream and downstream of the cutting device.

To calculate the Poisson's ratio, a first measurement device 85 is also provided for measuring a first feeding speed of the web material N in the first position of the feeding path, and a second measurement device 87 for measuring a second feeding speed of the web material N in the second position of the feeding path. The speed measurement devices 85, 87 may comprise, for example, laser systems (known on the market), or devices for measuring the rotation speed of rotating members that are in contact with the web material N and whose peripheral speed is equal to the peripheral speed of the web material. To this end, inductive sensors, lasers detecting one or more reflecting surfaces suitably arranged along the roller circumference, magnetic sensors detecting one or more magnets suitably arranged along the roller circumference, may be provided, for instance.

The devices schematically indicated with 81 and 83 may be one or more of the devices mentioned above for determining the position of the edges of the web material N or of the strips S1-Sn, into which it has been slit.

In some embodiments, as schematically shown in FIG. 6, the first position where the devices 81 and 85 are arranged can match the point where the disc-shaped blades 13 and the counter-blades 15 perform the longitudinal cut. In this way, the width of the strips is equal to the distances between the cutting edges of the blades cutting the strips. In this case, the device 81 can simply be a device detecting the position of the cutting edges of the blades 13. No further detection means are therefore necessary to know the width of the strips in the first position.

In the first position, the longitudinal speed can be detected by optical means. Or, in case the counter-blades are formed by a counter-roller wrapped by the web material N, if there is no relative sliding between the web material N and the counter-roller, the speed of the web material N can be equal to the peripheral speed of the counter-roller. The rotation speed of the counter-roller can be easily detected.

Figure 7:
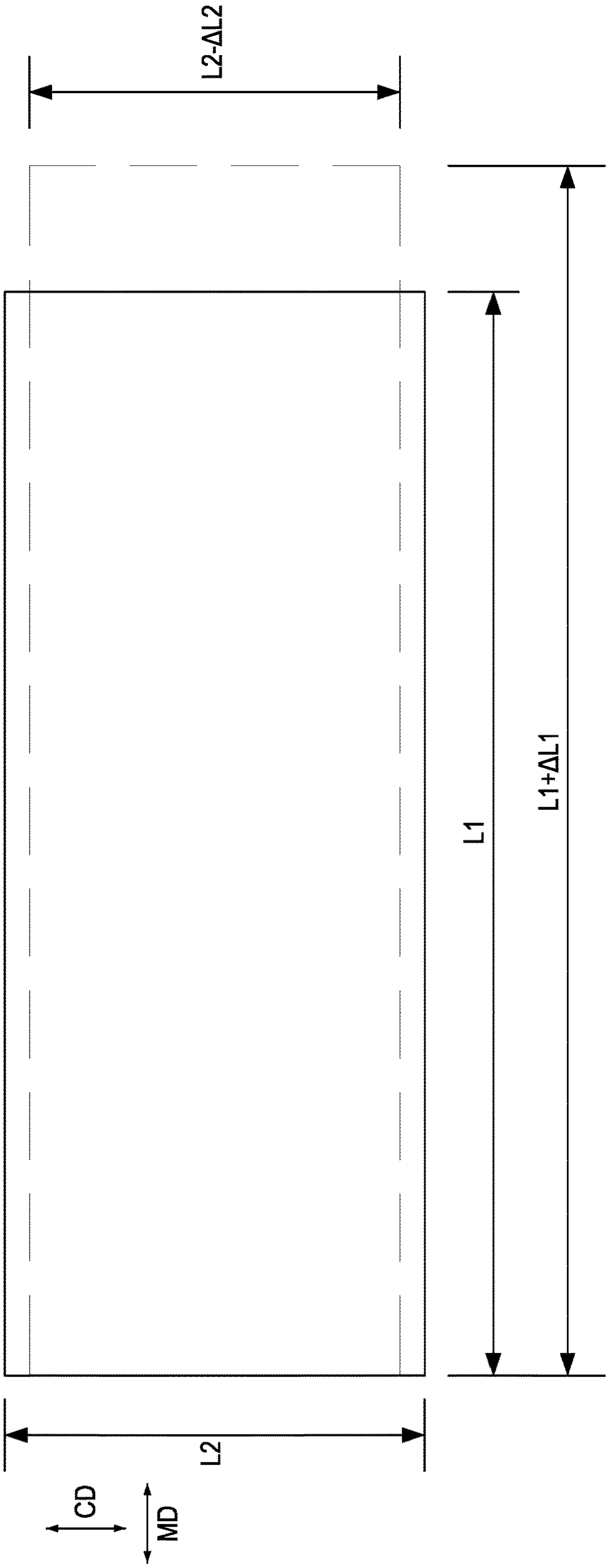
FIG. 7 is a diagram showing the parameters for calculating of the Poisson's ratio.

FIG. 7 schematically shows two portions of web material N in the first and in the second position of the feeding path. More particularly, the web material in the first position is represented by a continuous line, while the web material in the second position is indicated by a dashed line. Because of the traction applied to the web material, for example caused by the different feeding speed in the two positions, the web material is elongated longitudinally and shrinks transversely, as schematically indicated in FIG. 7.

The Poisson's ratio is given by the following formula:

$$CP = \frac{\frac{-\Delta L2}{L2}}{\frac{\Delta L1}{L1}}$$

where L1 and L2 are the length (dimension in machine direction MD) and the width (dimension in transverse direction CD) of the web material N in the first position. The values ΔL1 and ΔL2 are the variations in length and width due to the traction, to which the web material is subjected in the segment between the two positions.

Based on the kinematic formulas correlating speed and length of the web material, the following formula is easily obtained defining the Poisson's ratio CP:

$$CP = \frac{\frac{L2b - L2a}{L2a}}{\frac{V1b - V1a}{V1a}}$$

where (see also FIG. 7):

- L2a is the width of the web material detected by the first device to acquire information on the width of the web material,
- L2b is the width of the web material detected by the second device to acquire information on the width of the web material,
- V1a is the feeding speed of the web material in the first position, and
- V1b is the feeding speed of the web material in the second position.

In the description above, specific reference has been made to a slitter rewinder comprising a winding station, to which a series of strips of web material are fed, obtained by longitudinal cutting a web material from a primary reel unwound in an unwinding machine. Some of the features described above can also be used in a winding machine receiving a continuous web material directly from a transforming machine, for example a paper production continuous machine or a machine for producing a non-woven fabric.

Figure 8:
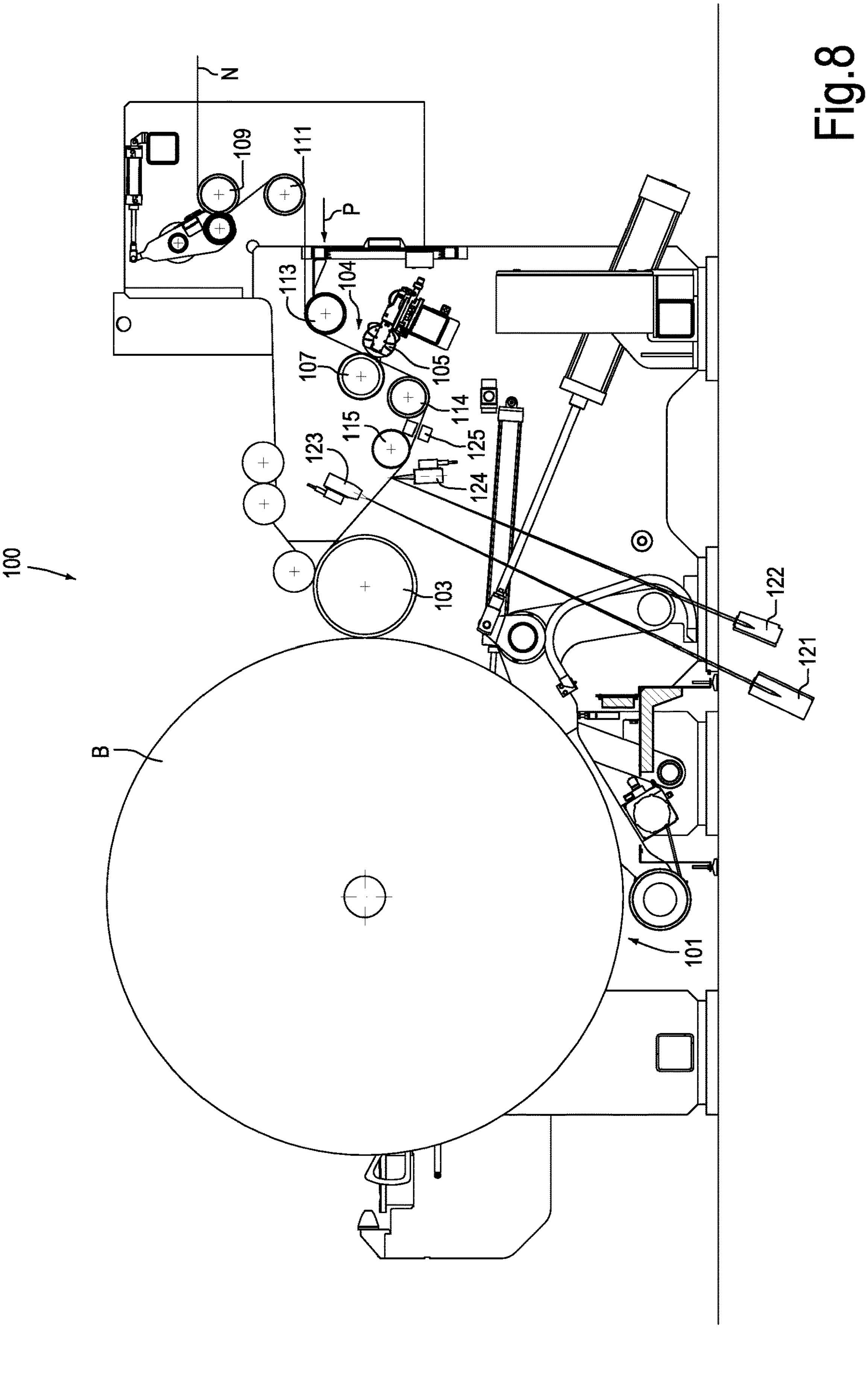
FIG. 8 is a schematic side view of a winder for producing reels of web material coming directly from a production machine.

FIG. 8 shows a diagram of a winding machine 100 of this type. The machine 100 comprises a winding station 101, for example adapted to receive secondary winding cores that are adjacent to, and coaxial with, one another. In this embodiment again, as in the previous case, the winding cores can be inserted onto an expandable winding rod or shaft. The winding machine 100 also comprises a cutting device 104 with a plurality of blades 105 and one or more counter-blades 107. The cutting device 104 is arranged upstream of the winding station with respect to the feeding direction of the web material N along a feeding path P, and is configured to slit the web material N into a plurality of strips S1-Sn.

The winding station 101 can comprise a winding roller 103, around which the strips of web material coming from the cutting device 104 are driven. Guide rollers 109, 111, 113, 114, and 115 may be arranged along the feeding path P of the web material N, both upstream and downstream of the cutting device 104.

In some embodiments, the winding machine 100 comprises a web material evaluation system. The evaluation system can comprise, for example, a metal detector 125, which has the same function as the metal detector 50 described with reference to FIG. 1. The metal detector can be provided along the segment of feeding path P between the guide rollers 114 and 115, advantageously downstream of the cutting device 104.

In addition or alternatively, the web material evaluation system can comprise one or more video cameras, as described with reference to FIGS. 1 to 3. In FIG. 8, two video cameras 121 and 122 are shown, so arranged as to frame the web material feeding path downstream of the cutting device 104 and advantageously as close as possible to the winding roller 103, for the same purposes and reasons described above. Respective lighting devices, schematically indicated with 123 and 124, are associated to the two video cameras 121, 122. The optical system comprising the video camera 121 and the lighting device 123 works in transparency, while the optical system comprising the video camera 122 and the lighting device 124 works in reflection. The number and arrangement of the video cameras are given just by way of example, and in further embodiments a greater number of video cameras or different positions thereof can be provided.

The video cameras can be stationary or movable, for example movable transversely with respect to the web material feeding path, i.e. orthogonally to FIG. 8. Furthermore, each video camera 121, 122 can be one of a group, or linear array, of video cameras, aligned transversely to the feeding path P.

The video cameras can be used to perform the functions described with reference to the previous embodiments, and in particular also for determining the Poisson's ratio, managing the neck-in of the web material and performing other functions described above. In addition to video cameras, the winding machine can also comprise devices for detecting the feeding speed of the web material and the position of the cutting blades, for example for calculating the Poisson's ratio.

The invention has been described with reference to various specific embodiments, but it will be clearly apparent to those skilled in the art that many modifications, changes and omissions are possible, without however departing from the scope of protection as defined by the attached claims.

For example, in the embodiments described above, a cutting device slitting the web material into strips is always provided and the strips are wound into a plurality of secondary reels formed in parallel and simultaneously in the winding station. However, in other embodiments, the machine may have no cutting device, or the cutting device may be inoperative. In this case, the secondary reels formed in the winding station have an axial length equal to the width of the web material fed to the machine, but can have for example a smaller diameter than the parent reel feeding the web material. Even in a situation of this kind, it may be advantageous to measure the Poisson's ratio in line, i.e. while feeding the web material, so as to have real time values for the purposes mentioned above or for other purposes useful to the web material manufacturer and/or useful for the converting processes downstream of the winding into secondary reels.

The invention claimed is:

1. A machine for winding a web material into a plurality of secondary reels, the machine comprising:

- a web material feeding path;
- a winding station, adapted to receive one or more secondary winding cores and to form secondary reels of web material therearound; and
- an in-line measurement arrangement for measuring the Poisson's ratio of the web material, wherein the in-line measurement arrangement for measuring the Poisson's ratio comprises in combination:
- a first measurement device adapted to measure a first feeding speed of the web material in a first position of the web material feeding path of the web material towards the winding station;
- a second measurement device adapted to measure a second feeding speed of the web material in a second position of the web material feeding path of the web material towards the winding station, downstream of the first position of the web material feeding path;

a first device adapted to acquire information on a first width of the web material in the first position of the web material feeding path; and a second device adapted to acquire information on a second width of the web material in the second position of the web material feeding path.

2. The machine of claim 1, further comprising a cutting device, with a plurality of blades, arranged upstream of the winding station with respect to the feeding direction of the web material and adapted to slit the web material into a plurality of strips of web material.

3. The machine of claim 2, wherein the in-line measurement arrangement for measuring the Poisson's ratio is adapted to measure the Poisson's ratio of the strips of web material formed by means of the cutting device.

4. The machine of claim 1, further comprising a programmable processing unit configured to calculate the Poisson's ratio based on the following formula:

$$CP=((L2b-L2a)/L2a)/((V1b-V1a)/V1a)$$

where:

L2a is the first width of the web material detected by the first device for acquiring information on the first width of the web material, L2b is the second width of the web material detected by the second device for acquiring information on the second width of the web material, V1a is the first feeding speed of the web material in the first position, V1b is the second feeding speed of the web material in the second position.

5. A method for winding a web material, the method comprising the following steps:

feeding a web material along a feeding path towards a winding station;

winding the web material and forming, therewith, a plurality of secondary reels;

detecting the Poisson's ratio of the web material during a forward movement thereof along said feeding path;

measuring a first feeding speed of the web material in a first position of the feeding path of the web material towards the winding station;

measuring a second feeding speed of the web material in a second position of the feeding path of the web material towards the winding station, downstream of the first position of the feeding path;

acquiring information on a first width of the web material in the first position of the feeding path;

acquiring information on a second width of the web material in the second position of the feeding path.

6. The method of claim 5, further comprising the step of cutting the web material into a plurality of strips of web material along the feeding path; and wherein in the winding station at every winding cycle a series of winding cores is inserted, which are adjacent to one another and coaxial with one another, on which said strips are wound to form simultaneously a series of secondary reels.

7. The method of claim 5, wherein the Poisson's ratio is calculated based on the following formula:

$$CP=((L2b-L2a)/L2a)/((V1b-V1a)/V1a)$$

where:

L2a is the first width of the web material in the first position;

L2b is the second width of the web material in the second position;

V1a is the first feeding speed of the web material in the first position;

V1b is the second feeding speed of the web material in the second position.

8. The method of claim 5, wherein the Poisson's ratio of the web material is detected in a portion of the feeding path downstream of a cutting device which cuts the web material into strips of web material.

9. The method of claim 5, wherein the web material is unwound from a primary reel.

* * * * *